United States Patent Office 3,490,343
Patented Jan. 20, 1970

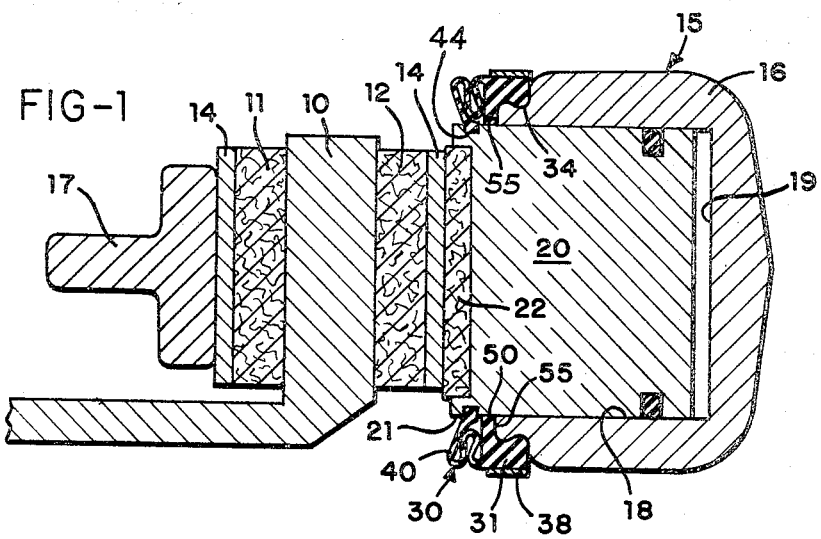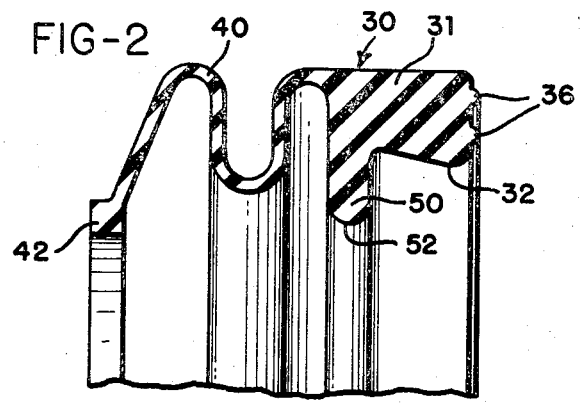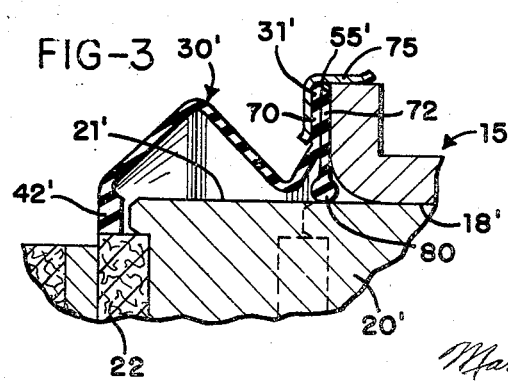

3,490,343
HYDRAULIC DISK BRAKES
Carlos P. Afanador, Centerville, and Russell E. Rike, Bellbrook, Ohio, assignors to The Dayton Steel Foundry Company, Dayton, Ohio, a corporation of Ohio
Filed Oct. 12, 1967, Ser. No. 674,791
Int. Cl. F16j 15/18
U.S. Cl. 92—168                                    2 Claims

ABSTRACT OF THE DISCLOSURE

A combined piston boot seal and wiper encircles the hydraulic cylinder in a disk brake and includes an integral wiper which rides on the outer surface of the piston inwardly of a bellows-type boot seal providing dual protection for the piston surface and for the cylinder bore from road hazards, contamination and the like.

BACKGROUND OF THE INVENTION

In disk brakes for automotive vehicles and the like, the hydraulic piston units are normally exposed and are thus subject to contamination by deicing salts, water and oil, and to impact damage by rocks and gravel. It is also important to seal out ordinary dust and dirt. Disk brake piston units are subject to hazards to an extent not normally encountered in drum brakes in which the piston units are well protected within the confines of the drum. Also, the piston units in disk brakes are frequently required to have a substantial extension or travel in order to utilize the full thickness of the lining. The total travel necessary in such piston units is doubled when the brake is of the floating caliper type in which the hydraulic force is applied at one side only of the disk and a reaction force is applied to the opposite brake pad by reason of the aligning movement of the caliper housing.

It has been found necessary to protect the exposed outer surface of the piston as well as the inside surface of the cylinder from contaminants and mechanical road hazards. Frequently such pistons are formed of aluminum and are thus subject to corrosion as well as to physical damage. Also, the cylinders are frequently formed of cast iron and the bore may be readily damaged by the intrusion of chemicals, such as common deicing salts and the like.

For this reason, piston boots have come into common use for the purpose of protecting the exposed outer surface of the piston and the cylinder bore. However, these boots themselves, are frequently subject to cuts and abrasions. This is a particular problem in the floating caliper type of brake, as mentioned above, due to the extensive travel necessary, in which a substantial portion of the boot is exposed to such road hazards.

SUMMARY OF THE INVENTION

This invention provides an improved hydraulic piston arrangement particularly adapted for use on disk brakes in which a piston is protected by a sealing boot and by a wiper positioned in wiping or sliding engagement with the outer surface of the piston adjacent the cylinder opening. Preferably, the improved sealing boot arrangement is made of a molded elastomer which is provided with a bellows having a forward beaded portion received in encircling relation to or on the piston, and an integral wiping lip formed in abutment with the forward face of the cylinder and in wiping engagement with the outer surface of the piston, although it is within the scope of the invention to form the wiper as a separate item from the bellows. Thus, dual protection is provided, and if for some reason the bellows should become ineffective such as by being ruptured or broken, the wiping seal continues to function to protect the brake parts. On the other hand, as long as the bellows is intact, it serves to protect the wiper from outside contaminants, thereby effectively prolonging the life of the seal.

It is accordingly an important object of this invention to provide an improved hydraulic piston arrangement for a disk brake which incorporates a piston seal having both an annular extensible barrier, such as a bellows, extending between the piston and the associated housing, in combination with an annular wiper which is positioned inwardly of the extensible bellows in wiping engagement with the exposed outer surface of the piston.

It is a more specific object of this invention to provide an improved seal for hydraulic pistons formed as an annular elastomeric member with a body adapted to be mounted directly on a forward portion of the cylinder adjacent its open end and including both an integral wiper engaging the outer surface of the piston and a bellows for enclosing such outer surface, providing dual protection to seal out contaminants.

These and other objects and advantages of the present invention will be apparent from the following description, the accompanying drawings and the appended claims.

BRIEF DESCRIPTION OF THE DRAWINGS

FIG. 1 is a vertical section through a caliper-type disk brake according to this invention;

FIG. 2 is an enlarged vertical section through the improved piston sealing boot; and FIG. 3 is a modified form of the invention.

DESCRIPTION OF THE PREFERRED EMBODIMENTS

Referring to the figures of the drawing which illustrate preferred embodiments of the invention, a caliper type disk brake is shown including an annular disk 10 with friction pads 11 and 12 mounted for frictional engagement with the opposite surfaces of the disk 11. The respective friction plates 11 and 12 are provided with back-up plates 14 against which the braking forces are applied. A caliper housing 15 is shown in section as having a pressure portion 16 positioned on one side of the disk 10 and a reaction portion 17 positioned on the opposite side thereof.

The pressure portion 16 of the caliper housing is provided with an inwardly-facing cylinder bore 18 which has a closed end 19 and inwardly facing open end. A hydraulic force-applying piston 20 is slidably received within the bore 18 and has a forward portion 21 which protrudes from the bore open end. The forward portion 21 is provided with a heat isolator inset 22 and is positioned adjacent to the pad 12 and associated plate 14 for applying a braking force thereto. The details described thus far constitute a floating-caliper hydraulic brake which may be constructed, for example, according to the teaching of the application of Walther and Afanador, Ser. No. 520,343 filed Jan. 13, 1966 and assigned to the same assignee as this invention.

The invention provides sealing means for preventing the contamination of the exposed surface of the piston 20 and the cylinder bore 18 including an annular elastomeric boot 30, as shown in FIG. 2, having a body 31 adapted for mounting on the housing 15 in encircling relation to the open end of the cylinder bore. For this purpose, the body 31 may be provided with an annular, somewhat inwardly depending mounting surface 32 which is adapted to be received in a corresponding radially outwardly opening annular recess 34 formed in the cylinder housing 15 adjacent the open end of the cylinder bore 18. The body 30 may be formed with one or more annular protrusions 36, as shown in FIG. 2, which form high pressure sealing areas with the recess 34. The body may be snapped in place with the portions 32 received within the recess 34, and if desired may be positively retained by a suitable encircling band or clamp 38, as shown in FIG. 1.

The boot 30 further is formed with an integral annular bellows 40 terminating in a forward annular bead 42. The bead 42 is mounted on a suitable conforming recess 44 formed in the outer surface of the piston 20 adjacent its forward end 21. The bellows has sufficient convolutions to permit full extension of the piston 20, as the lining pads 11 and 12 wear, and defines an extensible barrier which extends effectively between the piston 20 and the housing 15 enclosing the exposed outer surface of the piston forward of the cylinder bore 18.

The invention further includes means on the boot 30 forming an annular, inwardly depending wiper lip 50 which is positioned in wiping engagement with the outer surface of the piston 20. The wiper lip 50 is preferably formed as an integral inwardly extending portion of the body 31 positioned at the forward edge of the housing 15 and is formed of such a length that the wiping tip 52 is somewhat compressed against the outer cylindrical surface of the piston 20. This condition of compression may be effectively maintained by the encircling clamp 38 or may be effective, without the use of a clamp, merely by elastic deformation caused by the contraction of the body 31 about the recess 34.

It will thus be seen that the wiper lip 50 is positioned both radially and axially inwardly of the bellows 40, and is protected by the bellows. When thus located, the wiper defined by the lip 50 has a back surface 54 which is in abutment with a conforming and corresponding forward surface 55 at the front edge of the housing, which thereby defines a back-up support for the wiping lip 50.

The bellows 40 as anchored by the bead 42 provides protection for the exposed outer surface of the piston 20 and similarly provides protection for the wiper lip 50. However, in the event that the bellows 40 should become broken or ruptured, the seal provided by the wiper lip 50 will continue to function and protect the portion of the cylinder 20 remaining inwardly of the bore 18, as well as the bore itself, from contamination. Therefore, the effectiveness of the brake will not be substantially reduced or destroyed due to rupture of the bellows 20, and the unit may continue to operate satisfactorily until such time as the brake pads require attention.

In FIG. 3 there is shown a modified form of a combined boot and wiper seal which is particularly adapted for application to disk brakes in which the caliper housing 15' and the piston 20' have no special provision for employment of a sealing boot, as such. A large number of disk brakes have been designed in which no provision has been made for the employment of sealing boots. In such cases, it has frequently been found desirable to employ a boot in order to extend the useful life of the piston and to prevent contamination of the cylinder bore and the outer surfaces of the piston, for the reasons which have been previously noted.

The boot 30' of FIG. 3 is formed with an annular forward bead 42' at its free end which is adapted to seat directly on the outer surface of the heat isolating insert 22, just forward of the forward face of the piston 20'. For this purpose, the bead 42' may be made of a slightly smaller diameter than that of the insert 22 and suitably expanded or stretched into place. The body 31' of the boot 30' is formed by doubling the boot back upon itself forming a pair of adjacent boot layers 70 and 72 which are retained in clamped relation against the forward face 55' of the caliper housing by means of an encircling L-shaped clamp 75. The layer 72 of the boot 30' extends radially inwardly and is terminated in an enlarged annular wiper 80 generally circular in cross section. The wiper 80 engages the outer surface 31' of the piston 20', adjacent the forward face 55' of the caliper housing and operates substantially in the manner described above in connection with the wiper lip 50 to provide protection for the piston and the cooperating cylinder bore.

While the forms of apparatus herein described constitute preferred embodiments of this invention, it is to be understood that the invention is not limited to these precise forms of apparatus, and that changes may be made therein without departing from the scope of the invention.

What is claimed is:

1. An improved hydraulic piston arrangement for a disk brake comprising a hydraulic piston housing having means defining a cylinder bore therein having a closed end and an open end, means in said housing defining an annular generally outwardly-opening recess in surrounding relation to said bore adjacent said bore open end, a piston slidably received in said bore and having an exposed forward portion thereof protruding from said bore open end for applying a braking force upon the application of hydraulic fluid under pressure between said piston and said closed end of said bore, a piston sealing boot having a body portion mounted on said housing in said recess in encircling relation to said bore open end and having means defining an integral wiping lip with said lip extending radially inwardly from a forward wall of said recess into wiping engagement with the said piston exposed forward portion immediately adjacent the said bore open end, means on said boot forming an extensible bellows formed integrally with said body portion and having a free end anchored in encircling sealing relation to said piston at a location on said forward portion outwardly of said lip and enclosing said lip and the exposed outer surface of said piston forward of said bore protecting said lip and said piston surface from road hazards and contamination, and said body portion having an annular protrusion defining an area of relatively higher pressure contact with said housing recess for sealing said boot at said housing.

2. An improved hydraulic piston arrangement for a disk brake comprising a hydraulic piston housing having means defining a cylinder bore therein having a closed end and an open end, a piston slidably received in said bore and having an exposed forward portion thereof protruding from said bore open end for applying a braking force upon the application of hydraulic fluid under pressure between said piston and said closed end of said bore, a piston sealing boot having a body mounted on said housing in encircling relation to said bore open end and having means defining an integral wiping lip in sliding engagement with the outer surface of said piston at said exposed forward portion, and means on said boot forming an extensible bellows having a free end anchored in encircling sealing relation to said piston at a location on said forward portion outwardly of said lip and enclosing said lip and the exposed outer surface of said piston forward of said bore protecting said lip and said piston surface from road hazards and contamination, said boot body comprising a portion of said boot bellows folded back upon itself to form a pair of boot layers, and means clamping said pair of boot layers on said housing adjacent said bore open end with the inner layer of said body extending radially inwardly and forming said wiper lip.

References Cited
UNITED STATES PATENTS

| | | | |
|---|---|---|---|
| Re. 24,870 | 9/1960 | Butler | 188—152.873 |
| 3,273,675 | 9/1966 | Brown | 188—73 |
| 3,331,473 | 7/1967 | Hayes | 188—73 |
| 3,346,076 | 10/1967 | Hayes | 188—73 |
| 1,914,600 | 6/1933 | Hewitt | 74—18.2 X |
| 2,089,491 | 8/1937 | Kuiper | 92—168 X |
| 2,202,351 | 5/1940 | Loweke | 74—18.2 X |
| 2,405,093 | 7/1946 | La Brie | 74—18.2 X |
| 2,992,027 | 7/1961 | Wright et al. | 277—58 |
| 3,143,927 | 8/1964 | French et al. | 92—165 X |
| 3,346,075 | 10/1967 | Swift | 74—18 X |
| 3,369,411 | 2/1968 | Hines | 74—18.2 |
| 3,381,591 | 5/1968 | Toschkoff | 92—168 |

FOREIGN PATENTS

| | | |
|---|---|---|
| 1,223,633 | 8/1966 | Germany. |
| 953,323 | 3/1964 | Great Britain. |

MARTIN P. SCHWADRON, Primary Examiner

IRWIN C. COHEN, Assistant Examiner

U.S. Cl. X.R.

74—18.2; 188—152